United States Patent [19]

Tanisake

[11] Patent Number: 5,123,202
[45] Date of Patent: Jun. 23, 1992

[54] INSECTICIDAL BAIT CONTAINER

[75] Inventor: Shigeo Tanisake, 951-1 Ayado, Tarui-cho, Fuwa-gun, Gifu, Japan

[73] Assignees: Shigeo Tanisake; Akira Tanisake, both of Gifu, Japan

[21] Appl. No.: 601,470

[22] Filed: Oct. 23, 1990

Related U.S. Application Data

[62] Division of Ser. No. 728,797, Apr. 30, 1985, abandoned.

Foreign Application Priority Data

Jun. 12, 1984 [JP] Japan ............................. 59-87529[U]

[51] Int. Cl.$^5$ ............................................. A01M 1/20
[52] U.S. Cl. ................................... 43/131; 43/132.1; 43/121
[58] Field of Search ................. 43/121, 132.1, 131

[56] References Cited

U.S. PATENT DOCUMENTS

| | | | |
|---|---|---|---|
| 1,372,780 | 3/1921 | Schenke | 43/121 |
| 1,394,626 | 10/1921 | Koch | 43/131 |
| 1,636,688 | 7/1927 | Harris | 424/148 |
| 1,700,517 | 1/1929 | Ross | 43/131 |
| 1,922,702 | 8/1933 | Kristman | 43/131 |
| 2,176,345 | 10/1939 | Hurwitt | 43/131 |
| 2,714,780 | 8/1955 | Glover | 43/131 |
| 2,896,362 | 7/1959 | Wingate | 45/131 |
| 3,040,470 | 6/1962 | Kanin | 43/131 |
| 3,603,470 | 9/1971 | Armour | 215/213 |
| 3,703,975 | 11/1972 | Wittemer | 215/213 |
| 3,776,406 | 12/1973 | Milbourne | 215/216 |
| 3,860,135 | 1/1975 | Yung et al. | 215/213 |
| 4,049,460 | 9/1977 | Broadbent | 424/84 |
| 4,160,824 | 7/1979 | Inazuka et al. | 424/84 |
| 4,205,066 | 5/1980 | Hennart et al. | 424/84 |
| 4,247,042 | 1/1981 | Schimanski et al. | 239/59 |
| 4,386,071 | 5/1983 | Carle | 424/127 |
| 4,485,582 | 12/1984 | Morris | 43/131 |
| 4,563,836 | 1/1986 | Woodruff et al. | 43/131 |
| 4,627,981 | 12/1986 | Shimano et al. | 424/84 |
| 4,793,502 | 12/1988 | Beck | 215/235 |
| 4,826,682 | 5/1989 | Sakharova | 424/84 |
| 4,911,907 | 3/1990 | Shimamura et al. | 424/84 |
| 4,944,950 | 7/1990 | Sakharova | 424/84 |
| 4,959,221 | 9/1990 | Holmes | 424/659 |
| 4,974,735 | 12/1990 | Newell et al. | 215/235 |
| 4,988,510 | 1/1991 | Brenner et al. | 424/84 |
| 4,988,511 | 1/1991 | Demetre | 424/84 |
| 4,988,516 | 1/1991 | Herring | 424/659 |

FOREIGN PATENT DOCUMENTS

| | | | |
|---|---|---|---|
| 978853 | 12/1975 | Canada | 424/148 |
| 1093961 | 1/1981 | Canada | 424/148 |
| 0034426 | 8/1981 | European Pat. Off. | 43/131 |
| 2440339 | 3/1975 | Fed. Rep. of Germany | 424/659 |
| 2545598 | 11/1976 | Fed. Rep. of Germany | 43/131 |
| 714413 | 11/1931 | France | 424/148 |
| 1337380 | 8/1963 | France | 43/131 |
| 2491296 | 4/1982 | France | 424/148 |
| 2556562 | 6/1985 | France | 43/131 |
| 53-121935 | 10/1978 | Japan | 424/84 |
| 17120 | 2/1979 | Japan | 424/148 |
| 112310 | 7/1982 | Japan | 424/148 |
| 203001 | 12/1982 | Japan | 424/148 |
| 52205 | 3/1983 | Japan | 424/148 |
| 58-52205 | 3/1983 | Japan | 424/659 |
| 216108 | 12/1983 | Japan | 424/148 |
| 59-67209 | 4/1984 | Japan | 424/84 |
| 59-128317 | 7/1984 | Japan | 424/659 |
| 155305 | 9/1984 | Japan | 424/148 |
| 61-78705 | 4/1986 | Japan | 424/659 |
| 61-93101 | 5/1986 | Japan | 43/131 |
| 61-119131 | 6/1986 | Japan | 43/131 |
| 82-03968 | 11/1982 | PCT Int'l Appl. | 43/131 |
| 193851 | of 1938 | Switzerland | 43/131 |
| 290188 | 7/1953 | Switzerland | 424/148 |
| 2141106 | 12/1984 | United Kingdom | 43/131 |

OTHER PUBLICATIONS

Apr. 1990 USPTO Translation of Japanese Kokai Pat. No. Sho 59(1984)-67209 "A Cockroach Insecticide--Shigeo Tanisake" published Apr. 16, 1984.

(List continued on next page.)

Primary Examiner—Richard K. Seidel
Assistant Examiner—Patty E. Hong
Attorney, Agent, or Firm—Koda and Androlia

[57] ABSTRACT

An insecticidal bait container with one or more side openings, in which a dumpling-shaped lump of insecticidal bait is accommodated so as to kill a cockroach which comes through the openings and ingests the insecticidal bait.

2 Claims, 1 Drawing Sheet

OTHER PUBLICATIONS

Ahmed, CA 86:26873n (1977) (Cockroach Baits Contg. The Onion Juice of Pungent Onions were the Most Effective in Testing for Attractancy for Cockroaches).

Derwent 83-744804/34 Kato Japan 121203 Jul. 19, 1983, 1 page.

USPTO Translation of Hazebucki Ger. 2440339 Jun. 3, 1975, 7 pages.

Yoshino, CA 101:165591k (1984) of JP 59128318 Jul. 24, 1984 Grated Onion in Cockroach Bait!.

Bierman, CA 99:208153d (1983) of Belg. 896552 Aug. 16, 1983 Onion Juice Insect Repellent!.

Soni, CA 91:118597g (1979) of Bull. Entomol. Res. 692:291g (1979) Onion Oil Insect Attractant.

Kajitani, CA 80:46653v (1974) of JPN. 73 28065 Aug. 29, 1973.

Dragoco, CA 65:6204h (1966) of FR 1417217 Nov. 12, 1965.

Dragoco, CA 75:47663g (1971) of U.S. 3,582,361 Jun. 1, 1971.

American Potato, CA 65:11249f (1966) of Neth. Appl. 6514366 May 16, 1966.

Saburo, CA 52:16652g (1958) of Jpn 5871('57) Aug. 3.

Lee et al. CA 7:12691i (1953) of Food. Technol. 7: 162-164 (1953).

Miller, CA 46:198A (1952) of U.S. 2,543,250 Feb. 27, 1951.

INSECTICIDAL BAIT CONTAINER

This is a division of U.S. application Ser. No. 728,797, filed Apr. 30, 1985, now abandoned.

BACKGROUND OF THE INVENTION

1. Field of the Invention

The present invention relates to cockroach insecticide wherein onion is used as attractant substance and as solidification agent and is blended with boric acid and bait substance.

2. Description of the Prior Art

Such methods as to use insecticide, to use repellent, to use attractant substance and a trap together have been known as exterminating methods for the cockroaches. Conventionally, insecticide method by organic chlorine agent was known, and it was very effective for the extermination of the cockroaches to spray the insecticide having strong residual effect, e.g., the organic chlorine agent such as DDT and BHC, on places such as kitchen, dining room and bathroom where the cockroaches frequently appeared. However, since there was fear that it was also poisonous to the humans, the use is presently prohibited. These days, organic phosphoric insecticide having weak poisonous character is used. Although, this has insecticidal power if it is directly sprayed on the cockroaches, it has weak residual effect, and thus, can not exterminate the unvisible cockroaches.

As the method to use the attractant substance and the trap together, such methods are known that a bait is put in the trap of a push-up type and that adhesive is applied on the trap so as to catch the legs of the cockroaches entered therein by the adhesive and restrain the action and escape therefrom. Although, the cockroaches entered in the trap can be exterminated by these methods, these are not effective to prevent breeding and propagation, and thus, can exterminate only a part of the cockroaches in the house. Further, if many traps are set in the house, they may disadvantageously impede housework, walk and others.

Moreover, in these conventional methods for exterminating the cockroaches, although the prompt effect and temporary effect can be expected, they have not extermination effect which remains for a long term.

BRIEF SUMMARY OF THE INVENTION

The present inventor has earnestly studied to overcome the above-noted problems and has consequently attained to the present invention. The present invention is to provide such cockroach insecticide that the cockroaches can be exterminated from the house by setting it on a few or some places in a house and the effect thereof can be maintained for a long term. In the cockroach insecticide according to the invention, bait substance and boric acid are blended, onion is used as cockroach attractant substance and as solidification agent and these are kneaded and solidified into a dumpling-like lump.

Namely, according to the cockroach insecticide of the invention, the bait substance which the cockroaches like to bait and the insecticidal boric acid which the cockroaches do not avoid to take are solidified by means of the onion, so that the insecticide may have attractability, facilitate the taking thereof by the cockroaches and maintain the strong insecticidal power for a long term.

According to the invention, as stated above, daily necessaries are used except for the boric acid and the manufacturing process is simple, so that it can be manufactured very inexpensively.

Further, according to the invention, since the bait substance, the boric acid including the effective insecticidal ingredient and the onion which is the attractant substance are kneaded together and solidified into a dumpling-like form, the cockroaches are attracted to the insecticide by the attractability of the stimulus smell included in the onion. In this case, the surface of the insecticide formed in the dumpling-like form may fully dried during a long use, which gradually reduces the attractive smell. However, the core thereof maintains undried condition, whereby the attractive smell can be exhaled therefrom for a long term.

Moreover, the present invention has such a feature that the onion is used not only as the attractant but also as the solidification agent. If the insecticide were formed merely into a dumpling-like lump, it would be cracked during a long use, and thus, the core would be dried in a short term, so that it would be unable to exhale the attractive smell. However, in the present invention, the lump can be maintained in the dumpling-like form without a crack for a long term by the solidification force of the fibrous substance in the onion, whereby the attractive and insecticidal power can be maintained for a long term as stated before. Although, the boric acid, bait substance and water can be kneaded and dried, without using the onion, to form a lump which has an appearance similar to that of the embodiment of the present invention, it can not possibly achieve the effect same as that by the present invention, as will be apparent from experiments detailed later.

Still further, in the present invention, the solid bait insecticide of a nearly hemispheric shape is used at a place such as a corner in the kitchen where the cockroaches appear and pass. However, if it is set as it is, there is such danger that the place around it is soiled and that a baby may carelessly eat it. Therefore, the solid bait insecticide according to the invention is set in a special container, as illustrated in the accompanying drawings, which is a hemispheric container of synthetic resin or the like, so that the cockroaches may bait the insecticide in the container only through the window provided in the container.

DETAILED DESCRIPTION

As bait substance in cockroach insecticide of the present invention, grain flour such as rice bran, rice flour, wheat flour and corn flour, animal bait such as fish powder, bone powder, dry milk powder, butter and milk, or sugar can be used.

Figure 1:
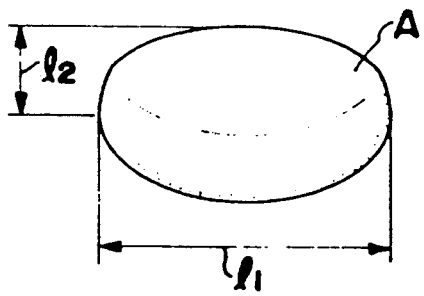
FIG. 1 is a perspective view of a lump of solid insecticide according to the invention.

According to the invention, onion is ground by a mixer or the like, then boric acid and the bait substance are added thereto and sufficiently kneaded to form dumpling-like form of a hemispherical shape, as shown in FIG. 1, having a diameter $l_1$ of about 30–40 mm and a thickness $l_2$ of about 10–15 mm, and then, they are dried and solidified to manufacture the solid insecticide A. If the diameter $l_1$ is less than 30 mm and the thickness $l_2$ is less than 10 mm, the solid insecticide A is dried up to its deep portion in a short term, and thus, the long continuability can not be expected. Contrarily, if the diameter $l_1$ is more than 40 mm and the thickness $l_1$ is more than 15 mm, it is considerably thick from the surface to the deep portion, so that it is impossible to effectively exhale the attractive smell from the deep portion to the exterior, and further, the deep portion may rot during a long use.

A blending ratio among the onion, boric acid and bait substance can be 30%–50%:60%–30%:10%–20% in weight ratio, and is most preferably about 40%:50%:15%.

Figure 2:
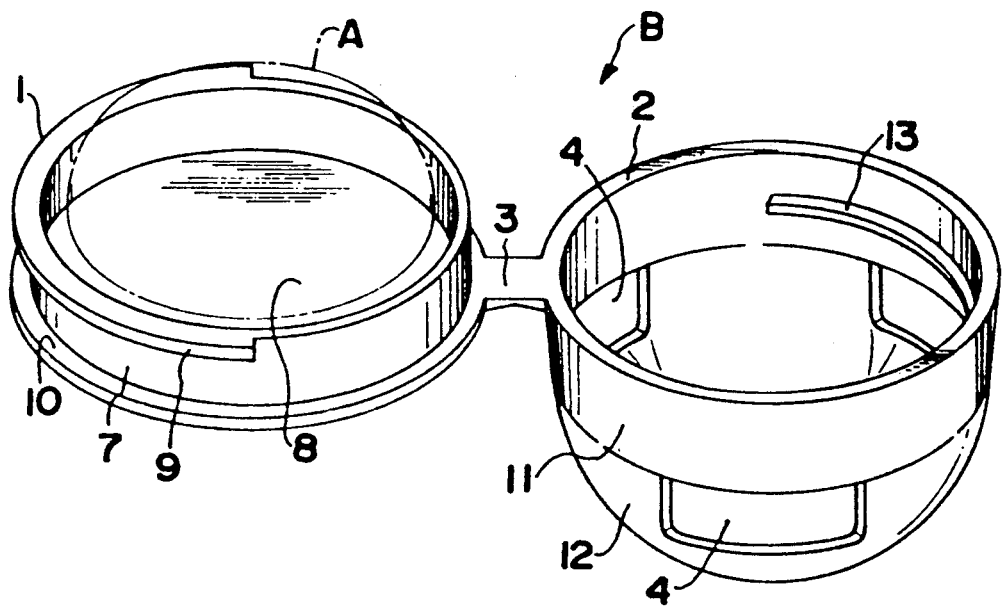
FIG. 2 is a perspective view of a container in an open condition in which the solid insecticide is adapted to be set.
Figure 3:
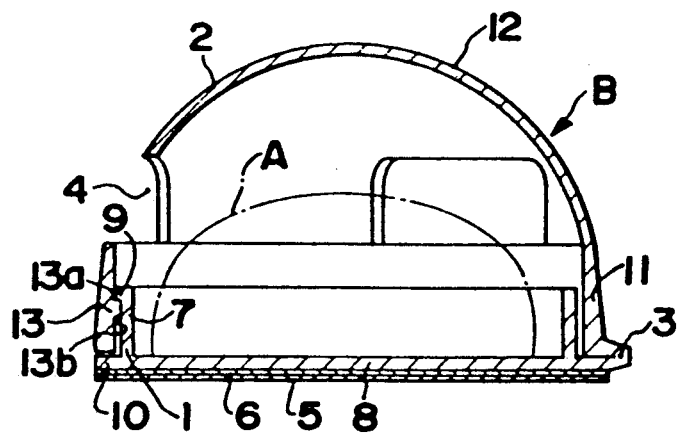
FIG. 3 is a perspective view of the container in a closed condition.

A container B in which the solid insecticide A is set is shown in FIGS. 2 and 3. When the solid insecticide A is used, it is necessarily set in the container B to use. The structure of this container B will be described considerably in details hereinafter.

Namely, the container B is provided with an annular case body 1 in which the bait insecticide A is set and a hemispherical cover body 2 which is formed closably and integrally with the case body 1 through a resilient hinge part 3. Said cover body 2 is provided with openings 4 for baiting, and said annular case body 1 is provided at the under surface with an adhesive layer 6 covered by a release paper 5. These case body 1, cover body 2 and the resilient hinge part 3 connecting both of them are integrally molded by synthetic resin, preferably by polypropylene resin. The annular case body 1 includes, as principal structure elements, an annular wall 7 of 30 mm in a diameter and a bottom wall 8 thereof. An engagement step 9 is formed at the outer peripheral upper edge of the annular wall 7. The outer periphery of the bottom wall 8 is projected radially outwardly beyond the annular wall 7 to integrally form a flange edge 10. The hemispherical dome-like cover body 2 includes, as principal structure elements, an annular wall 11 of about 35 mm in a diameter and a hemispherical dome-like wall 12. The annular wall 11 is integrally provided at the inner peripheral surface with an engagement projection 13 adapted to engage with said engagement step 9. As shown in FIG. 3, while an engagement surface 13a of the engagement projection 13 adapted to engage with the engagement step 9 is formed into a stepped shape, a passing surface 13b which is opposite thereto and adapted to pass over the engagement step 9 and be pressed downwardly is formed into a tapered shape. The hemispherical dome-like wall 12 is provided at the peripheral surface with the appropriately spaced square openings 4 of about 15 mm × 7 mm for baiting.

The adhesive layer 6 provided at the under surface of the annular case body 1 is preferably formed by an adhesive double coated tape, and the release paper 5 is applied thereon when unused.

Therefore, when it is used, as shown in FIG. 2, the dumpling-like bait insecticide A is put in the open case body 1, and then, the cover body 2 is shut to cover and close the case body 1. In this time, the engagement projection 13 of the cover body 2 is, as shown in FIG. 3, guided by the tapered passing surface 13b to smoothly pass over the engagement step 9 of the case body 1 and is pushed into it, whereby the engagement surface 13a is facilely engaged with the engagement projection 13. Once they are engaged together, the cover body 2, particularly a lower edge 14 thereof, is covered by said flange edge 10, so that there is no hook or the like which can be used for disengaging the cover body 2 from the case body 1. Therefore, it is difficult to disengage them from each other, and thus, there is no danger that a baby or a little child may carelessly open it and take out the insecticide.

As shown in FIG. 3, the closed case is set and fixed on a corner of a kitchen or the like by means of the adhesive layer 6 after the release paper 5 is released. Whereby, the cockroaches and other harmful insects bait the bait insecticide A through the openings 4 to be killed.

Embodiment 1

The onion of 400 g was ground by a mixer, then, was kneaded with the boric acid of 500 g, wheat flour of 125 g, sugar of 15 g and milk of 10 g, and was divided into about 50 pieces of the dumpling-like lumps respectively having a weight of about 20 g. These dumpling-like lumps were sufficiently dried by the direct rays of the sun for three days to form the lumps C. The lumps were put in said containers B and set in predetermined places.

Embodiment 2

The onion of 400 g was ground by a mixer, then, was kneaded with the boric acid of 400 g, rice bran of 130 g, sugar of 17 g and milk of 13 g, and was divided into about 50 pieces of the dumpling-like lumps respectively having a weight of about 20 g. These dumpling-like lumps were dried and solidified at 80° C. in a hot air dryer for 10 hours to form the lumps D. The lumps were put in said containers B and set in predetermined places.

EXAMPLE OF COMPARISON SAMPLE

Wheat flour of 300 g, boric acid of 500 g and sugar of 15 g were sufficiently blended. Milk of 15 g and water of 200 g were added thereto to form paste, and it was divided into about 50 pieces of dumpling-like lumps respectively having a weight of about 20 g. These dumpling-like lumps were dried and solidified at 80° C. in a hot air dryer for 10 hours to form the lumps R. The lumps were put in said containers B and set in predetermined places. Cockroach insecticidal effect experiment (experiment 1) and cockroach insecticidal effect maintenance experiment (experiment 2) were performed with using said lumps C, D and R as the sample lumps and without using the lumps.

EXPERIMENT 1

Water of about 5 cc and feed (powder feed for cockroaches) as well as the cockroaches were put in a plastics container of about 30 cm cube together with the lumps C, D or R or without the lumps, and lapsed days and a total number of the killed cockroaches were observed. The result thereof is shown in a Table 1. According to it, the cockroach insecticide according to the invention has superior insecticidal effect, attracts the many cockroaches from second or third day and shows insecticidal effect at early stage, in comparison with the comparison sample.

EXPERIMENT 2

Same experiments as the Experiment 1 were performed at intervals of predetermined terms after the manufacture of the lumps. The result is shown in Table 2. According to it, the cockroach insecticide according to the invention maintains the superior insecticidal effect especially even after long terms such as six months or ten months, and shown insecticidal effect for a term longer than the comparison sample.

TABLE 1

| Tested Lump | Tested Number | | Total Number of Killed Insects (Lapsed Days) | | | | | | |
|---|---|---|---|---|---|---|---|---|---|
| | | | 2 | 4 | 6 | 8 | 10 | 12 | 14 | 16 |
| C 2 pcs | *Periplaneta* | 10 | 1 | 1 | 3 | 6 | 8 | 9 | 10 | 10 |
| D 2 pcs | *fuliginosa* | 10 | 1 | 1 | 3 | 5 | 7 | 8 | 10 | 10 |
| R 2 pcs | SERVILLE | 10 | 1 | 1 | 2 | 4 | 6 | 8 | 9 | 10 |
| Non | | 0 | 0 | 0 | 0 | 0 | 0 | 0 | 0 | 0 |
| C 2 pcs | *Periplaneta* | 10 | 0 | 2 | 4 | 8 | 8 | 9 | 10 | 10 |
| D 2 pcs | *japonica* | 10 | 1 | 2 | 4 | 7 | 7 | 8 | 9 | 10 |
| R 2 pcs | KARNY | 10 | 0 | 1 | 2 | 5 | 7 | 7 | 9 | 10 |
| Non | | 0 | 0 | 0 | 0 | 0 | 0 | 0 | 0 | 0 |

TABLE 2

| Tested Lump | Mth | Tested Number | | Total Number of Killed Insects (Lapsed Days) | | | | | | |
|---|---|---|---|---|---|---|---|---|---|---|
| | | | | 2 | 4 | 6 | 8 | 10 | 12 | 14 | 16 |
| C 2 pcs | 1 | *Periplaneta* | 10 | 1 | 1 | 3 | 6 | 8 | 9 | 10 | 10 |
| | 3 | *fuliginosa* | 6 | 0 | 1 | 2 | 4 | 5 | 5 | 6 | 6 |
| | 6 | SERVILLE | 6 | 1 | 1 | 2 | 3 | 4 | 5 | 6 | 6 |
| | 10 | | 6 | 0 | 1 | 1 | 2 | 4 | 5 | 6 | 6 |
| D 2 pcs | 1 | | 10 | 1 | 1 | 3 | 5 | 7 | 8 | 10 | 10 |
| | 3 | | 6 | 1 | 1 | 2 | 4 | 5 | 5 | 6 | 6 |
| | 6 | | 6 | 0 | 2 | 2 | 3 | 5 | 5 | 6 | 6 |
| | 10 | | 6 | 1 | 2 | 2 | 3 | 3 | 4 | 6 | 6 |
| R 2 pcs | 1 | | 10 | 1 | 1 | 2 | 4 | 6 | 8 | 9 | 10 |
| | 3 | | 6 | 0 | 1 | 1 | 2 | 3 | 4 | 4 | 5 |
| | 6 | | 6 | 0 | 0 | 0 | 1 | 1 | 1 | 1 | 2 |
| | 10 | | 6 | 0 | 0 | 0 | 1 | 1 | 1 | 1 | 1 |
| C 2 pcs | 1 | *Periplaneta* | 6 | 0 | 1 | 2 | 4 | 5 | 5 | 6 | 6 |
| | 6 | *japonica* | 6 | 1 | 1 | 1 | 3 | 4 | 5 | 6 | 6 |
| | 10 | KARNY | 6 | 0 | 0 | 1 | 2 | 2 | 4 | 6 | 6 |
| D 2 pcs | 1 | | 6 | 1 | 1 | 2 | 4 | 5 | 5 | 6 | 6 |
| | 6 | | 6 | 1 | 1 | 2 | 3 | 4 | 5 | 6 | 6 |
| | 10 | | 6 | 0 | 0 | 2 | 3 | 4 | 5 | 6 | 6 |
| R 2 pcs | 1 | | 6 | 0 | 0 | 2 | 4 | 4 | 5 | 5 | 6 |
| | 6 | | 6 | 0 | 0 | 0 | 1 | 1 | 1 | 1 | 2 |
| | 10 | | 6 | 0 | 0 | 0 | 0 | 0 | 1 | 1 | 1 |

I claim:

1. A child proof insecticidal bait container comprising a circular cylindrical case body accommodating an insecticidal bait, said insecticidal bait comprising dumplings of boric acid and fresh onion, a hemispherical dome-like cover body for covering the case body which has at least one side opening for entrance and bait ingestion, and a resilient hinge part for connecting and integrating said case body and said cover body; wherein said case body comprises a circular cylindrical inner side wall having an engagement step formed integrally at an outer peripheral upper edge thereof, and a bottom wall having a flange edge formed integrally at an outer periphery thereof so as to project outwardly from the circular cylindrical inner side wall, while said cover body comprises a hemispherical dome-like wall with said at least one side opening provided therein and a circular cylindrical outer side wall having an inner peripheral face provided integrally with an engagement projection for engaging with said engagement step of the case body; and a lower edge of said circular cylindrical outer side wall of the cover body being faced closely to and being substantially flush externally with said flange edge of the case body when the case body is covered and shut with the cover body; whereby when said case body is covered and shut with the cover body, there is no hook or projection which could be used to open said bait container and a child proof insecticidal bait container is provided.

2. A child proof insecticidal bait container according to claim 1 further comprising an adhesive layer provided on an outside surface of a bottom of said case body.

* * * * *